(12) United States Patent
Oikawa et al.

(10) Patent No.: US 6,856,451 B2
(45) Date of Patent: Feb. 15, 2005

(54) OPTICAL COMMUNICATION SYSTEM

(75) Inventors: Masahiro Oikawa, Osaka (JP); Ken Yamashita, Osaka (JP); Chandrasekhar Roychoudhuri, Storrs, CT (US); Vladimir V. Serikov, Bonita, CA (US)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/263,340

(22) Filed: Oct. 3, 2002

(65) Prior Publication Data

US 2003/0174386 A1 Sep. 18, 2003

Related U.S. Application Data

(60) Provisional application No. 60/363,834, filed on Mar. 14, 2002.

(51) Int. Cl.[7] .................................................. G02F 1/37
(52) U.S. Cl. ........................................ 359/328; 359/332
(58) Field of Search .................................. 359/326–332

(56) References Cited

FOREIGN PATENT DOCUMENTS

JP          04107535    * 4/1992   ............. G02F/1/37

* cited by examiner

Primary Examiner—John D. Lee
(74) Attorney, Agent, or Firm—Whitham, Curtis & Christofferson, PC (57) ABSTRACT

An optical communication system is designed to suppress the generation of cross talk even in the case of small wavelength spacing and high bit-rate modulation. An Nth order harmonic generating device where N is an integer of 2 or larger is positioned before a demultiplexer to upconvert the frequency or down convert the wavetlength of the light wave by N times. The frequency spacing between the carriers is increased and allows easier separation of the optical signal and permits denser WDM channels and/or higher data rate per channel. In addition, Si or GaAs based photodiodes may be used instead of InP based photodiodes since the 1550 nm bands are converted to 780 nm bands.

8 Claims, 7 Drawing Sheets

OPTICAL COMMUNICATION SYSTEM

This application claims the benefit of provisional application No. 60/363,834, filed Mar. 14, 2002.

BACKGROUND OF THE INVENTION

The present invention is related to the field of optical fiber communication; especially to wavelength division multiplexed optical communication systems.

In optical fiber communication, the wavelength division multiplexing is a method for increasing communication capacity with an optical fiber. In this method, a plurality of carriers with different wavelengths, each for a different WDM channel, is modulated with different binary modulation signals. These modulated carriers are multiplexed and transmitted with an optical fiber. At the receiver side, the transmitted carrier is demultiplexed to original wavelengths and the respective signals are detected.

In the 1550 nm wavelength band usually used for optical fiber communication, actually carrier frequencies with the spacing of 50 to 100 GHz are standardized. Because the frequency spacing of $\Delta v=50$ GHz corresponds to the wavelength spacing of about 0.4 nm, a wavelength demultiplexer with a resolving power of at least R=3871 (by Rayleigh criterion) is required. The multiplexer or the demultiplexer could be any one of the standard commercial devices like a grating, or a dichroic beam splitter, or an array waveguide grating, or a tandem of Fabry-Perot etalons, etc. The modulation rate, on the other hand, is getting faster for increasing the transmission capacity. The high bit-rate modulation of carrier in time regime causes spectral fringe broadening in the frequency regime because of shorter data pulses. Therefore cross talk is liable to occur between adjacent channels whose wavelengths are close to each other. Thus indefinite and simultaneous increase of WDM channel density (i.e. channel separation) and increase of data rate per channel (i.e. shorter data pulse) are not compatible.

SUMMARY OF THE INVENTION

The object of the present invention is to solve the above problem by offering the optical communication systems suppressing the generation of cross talk even in the case of small wavelength spacing and high bit-rate modulation. The present invention is based on the following optical communication system.

For a WDM system with n channels, a plurality of n optical sources generates carriers with n unique wavelengths by their individual data modulators. Then a wavelength multiplexer combines the modulated carriers. The multiplexed wave is coupled to an optical fiber and propagated. On the receiver side, a wavelength demultiplexer separates the propagated wave to a plurality of modulated carriers with different wavelengths again. Then, a plurality of photo detectors detects the separated signals and transforms them to electrical signals. The present invention is featured by inserting an N-th order harmonic generating device (N is an integer, 2 or larger) before the demultiplexer. It up-converts the frequency (or down converts the wavelength) of the demultiplexed light wave by N times.

There are two possible system approaches to up-convert the multiplexed signal at the receiver station. First, all the optical channels (frequencies) can be simultaneously up-converted N-times, creating N times the original $\Delta v$ spacing between each optical channel. This reduces the resolution requirement of the demultiplexer by N times.

The alternative way is to up-convert the frequency of one optical channel at a time through a finely tuned nonlinear frequency up-converter. Then separate (demultiplex) only this up-converted channel from the rest of the channels continuing with the fundamental frequencies. Repeat this step sequentially n time for the n multiplexed channels. Now, in each step, the channel separation is approximately $N\Delta v$ instead of $\Delta v$. This, of course, reduces the resolution requirements significantly and one can use a simple dichroic mirror (beam splitter).

By the present invention, we have achieved triple benefits. (i) First, as the frequency spacing between the carriers is increased, the optical signal can be separated much easier, allowing the possibility of denser WDM channels and/or higher data rate per channel. (ii) Second, since the wavelengths of the 1550 nm band are converted to 780 nm bands, Si or Gas based photodiode can be used instead of InP based photodiode.

DETAILED DESCRIPTION OF PREFERRED EMBODIMENT

The preferred embodiments of the present invention are described referring to FIGS. 1 through 7.

Figure 1:
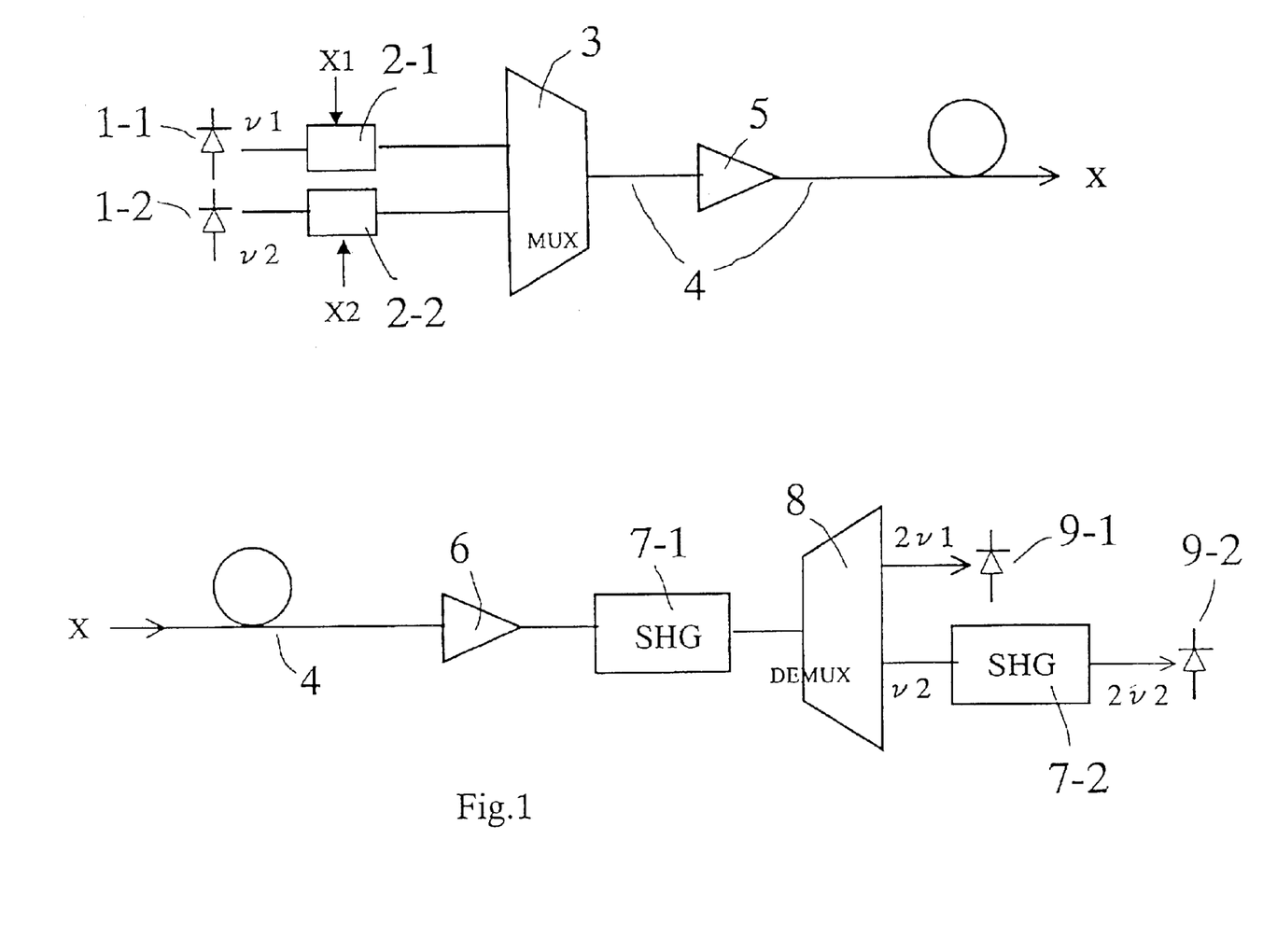
FIG. 1 shows a schematic diagram of the basic optical communication system according to the present invention.

FIG. 1 shows the basic arrangement of the optical communication system of the present invention. To describe the basic arrangement, the simplest two-channel system having two carriers with different frequencies is shown. The present invention is, however, essentially effective for the optical system having a plurality of n channels with close frequency spacing. More specific arrangement of practical systems with multiple channels will be described later.

Figure 2:
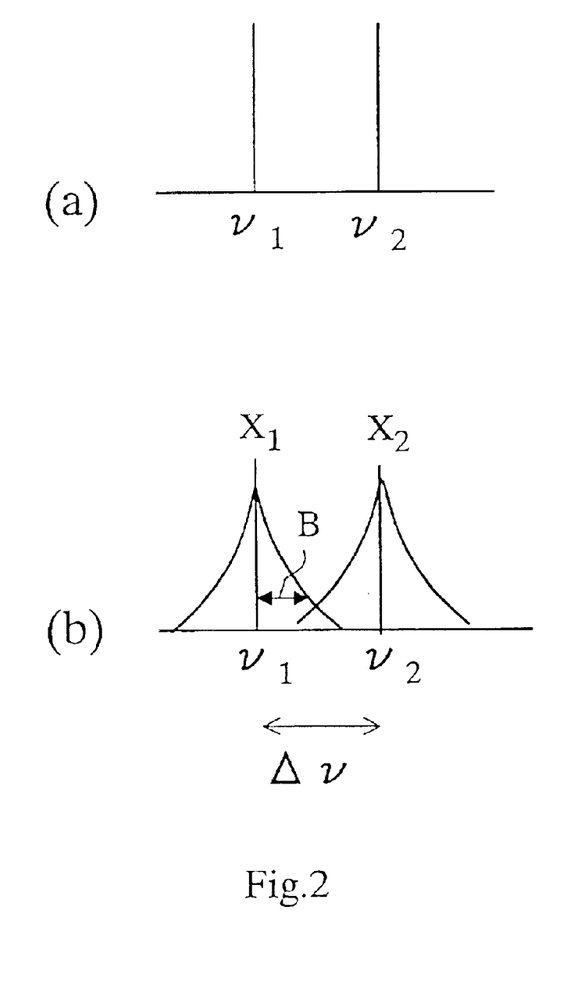
FIG. 2 shows (a) frequency spectra of two carriers and (b) that of modulated carriers.

As shown in FIG. 1, two optical sources 1-1, 1-2 with two different frequencies v1, v2 are prepared. FIG. 2(a) shows frequency spectrum of carriers generated with these optical sources. These carriers are modulated in binary amplitude with time sequence of pulses X1, X2 using optical modulators 2-1, 2-2. If the modulation rate of the time sequence of pulses is B bit/sec, frequency spectrum of modulated carriers is broadened to approximately B Hz as shown in FIG. 2(b). Therefore in case of smaller frequency spacing than B Hz, the cross talk will to occur between the adjacent channels.

At the transmitting station, the modulated carriers n-WDM channels are combined to a single beam of light with a wavelength multiplexer 3, and coupled to an optical fiber 4 and transmitted. The wavelength multiplexed light is amplified with optical amplifiers 5, 6 if required in order to (i) compensate for the attenuation through a long haul optical transmission fiber, and (ii) generate the second harmonic wave with high efficiency on the next stage as described below.

At the receiving station, the wavelength multiplexed light is put through a second harmonic generator (SHG, N=2) 7-1, wherein frequency component v1, for example, is doubled to 2v1 (The wavelength is converted to a half). The frequency converted carrier and non-converted carrier are separated with a wavelength demultiplexer 8, and the optical signal, which modulates the frequency converted carrier, is converted to the electrical signal (X1) with the photo detector 9-1. Then the carrier of non-converted frequency v2 is input to the SHG device 7-2 and doubled the frequency to 2v2, and the optical signal is converted to the electrical signal with the photo detector 9-2. Although the frequency component v2 may be input to the photo detector as it is, it is preferred to convert the frequency from the reason described below.

Figure 3:
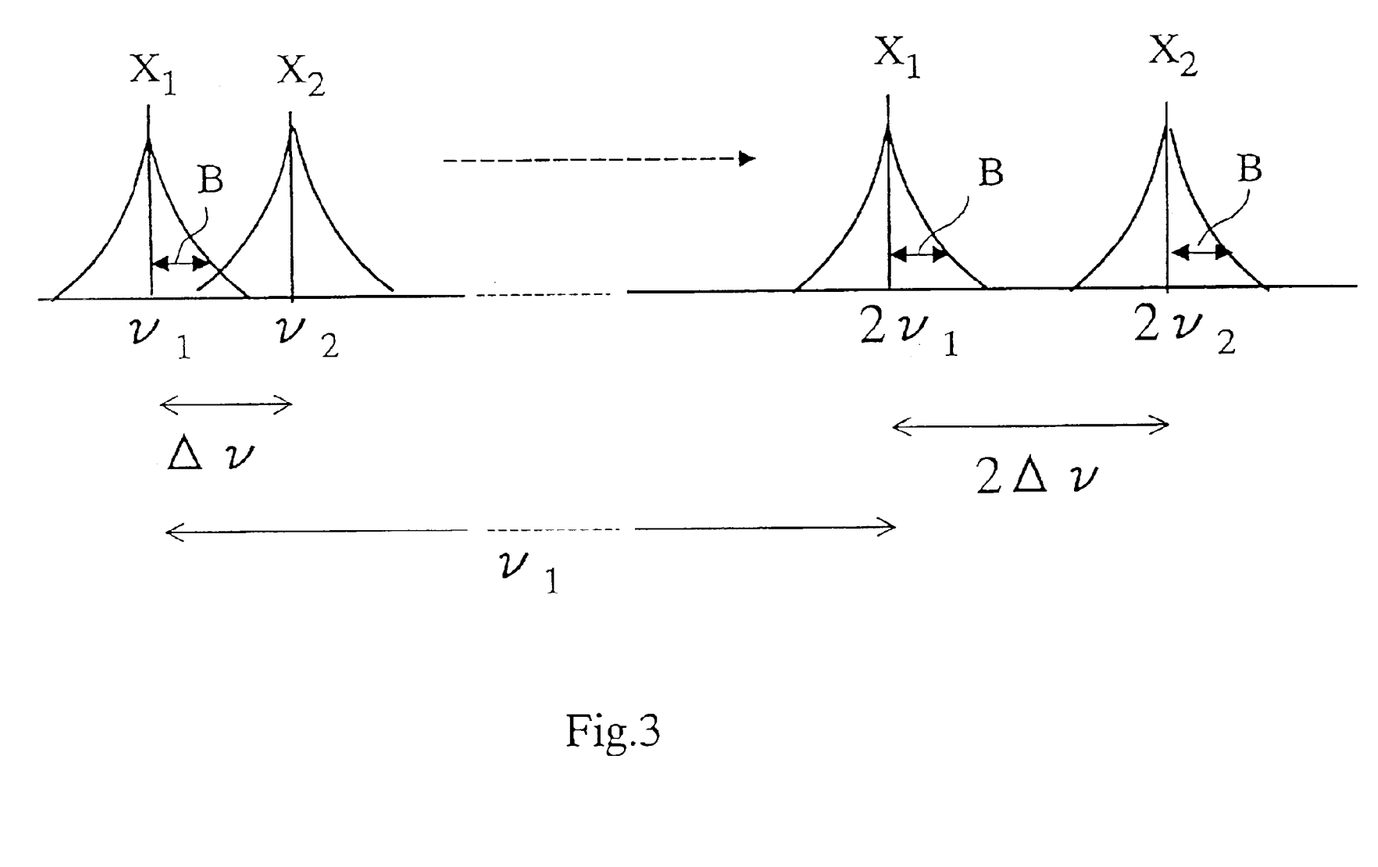
FIG. 3 shows frequency spectra of two modulated carriers before and after the frequency conversion.

As shown in FIG. 3, since the frequency spacing of above 2 carriers after frequency conversion is doubled, the cross talk between the two channels is reduced significantly. Furthermore, as the frequency spacing Δv(=v2−v1) between channels before the frequency conversion is very narrow, the frequency spacing between that of converted component and non-converted component is about v1, which is much wider, compared with Δv. This leads to a significantly reduced demand on the resolving power of the wavelength demultiplexer.

The optical signal modulating the frequency converted carrier is converted to the electrical signal with an optical detector 9-1. The non-converted carrier of frequency v2 is input to SHG 7-2, converted to the frequency of 2v2, and converted to the electrical signal with an optical detector 9-2. Although the carrier of frequency v2 may be input as it is, the frequency conversion is preferred according to the reason as described below.

Based on the basic arrangement above of the present invention, a specific embodiment is described below.

Figure 4:
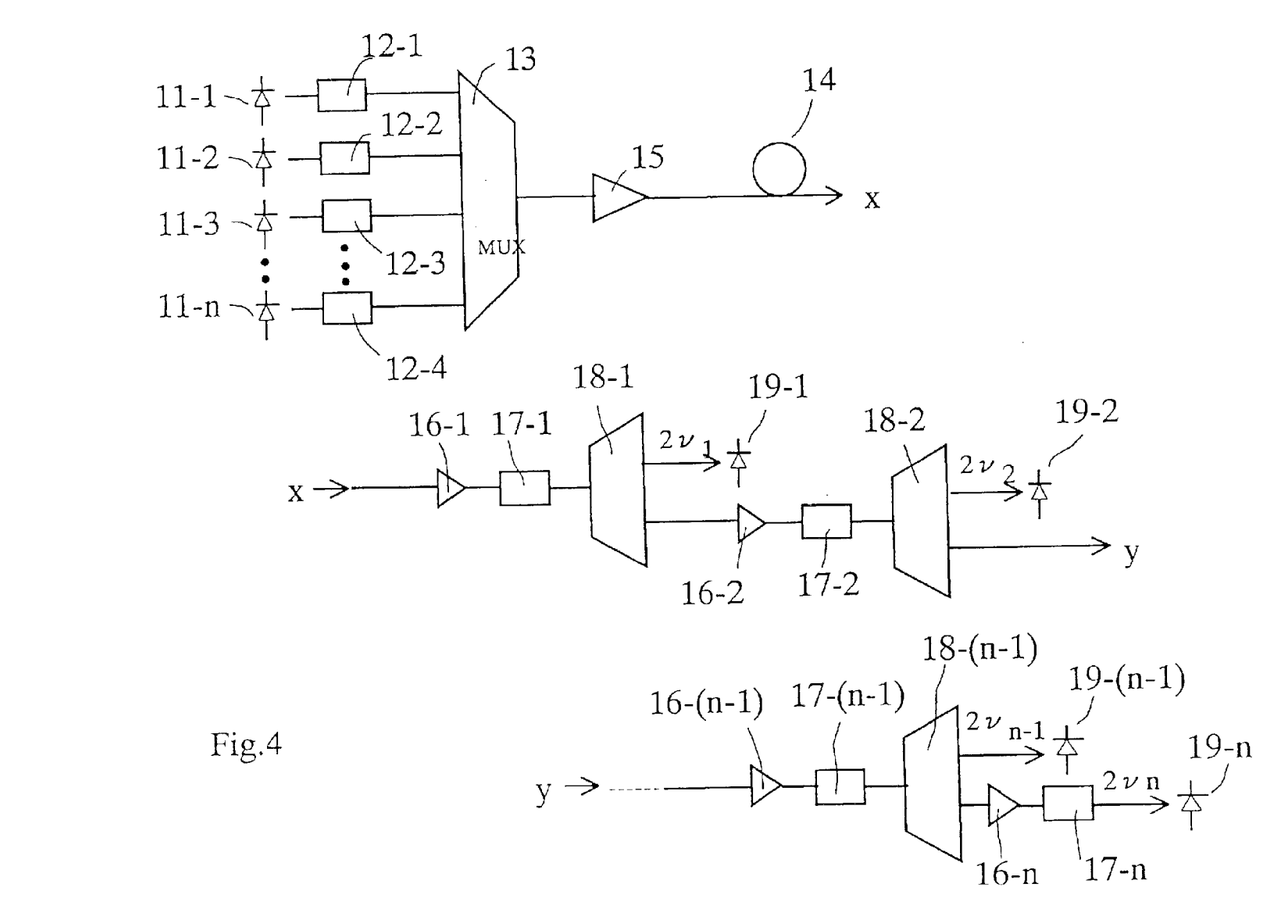
FIG. 4 shows a schematic diagram of the optical communication system of preferred embodiment.

As shown in FIG. 4, semiconductor lasers 11-1, 11-2 and 11-3 are prepared as optical sources of frequency v1 (193400 GHz, wavelength λ1=1550.12 nm), v2 (193450 GHz, λ2=1549.72 nm), and v3 (193500 GHz, λ3=1549.32 nm). The frequency spacing Δv is 50 GHz and the wavelength spacing Δλ is about 0.4 nm. For simplicity, numerical examples were shown for three channels only. Actually required number (n) of optical sources with frequency spacing of 50 GHz should be prepared. The wavelength stabilized, distributed feedback type of semiconductor laser is preferred for these purpose.

The generated carriers are modulated in binary amplitude with LiNbO3 optical modulators or the like 12-1, 12-2 and 12-3 by time sequence of pulses X1, X2, X3 . . . , Xn of modulation velocity of 10 Gbps respectively. The spectral broadening is about 10 GHz.

Figure 5:
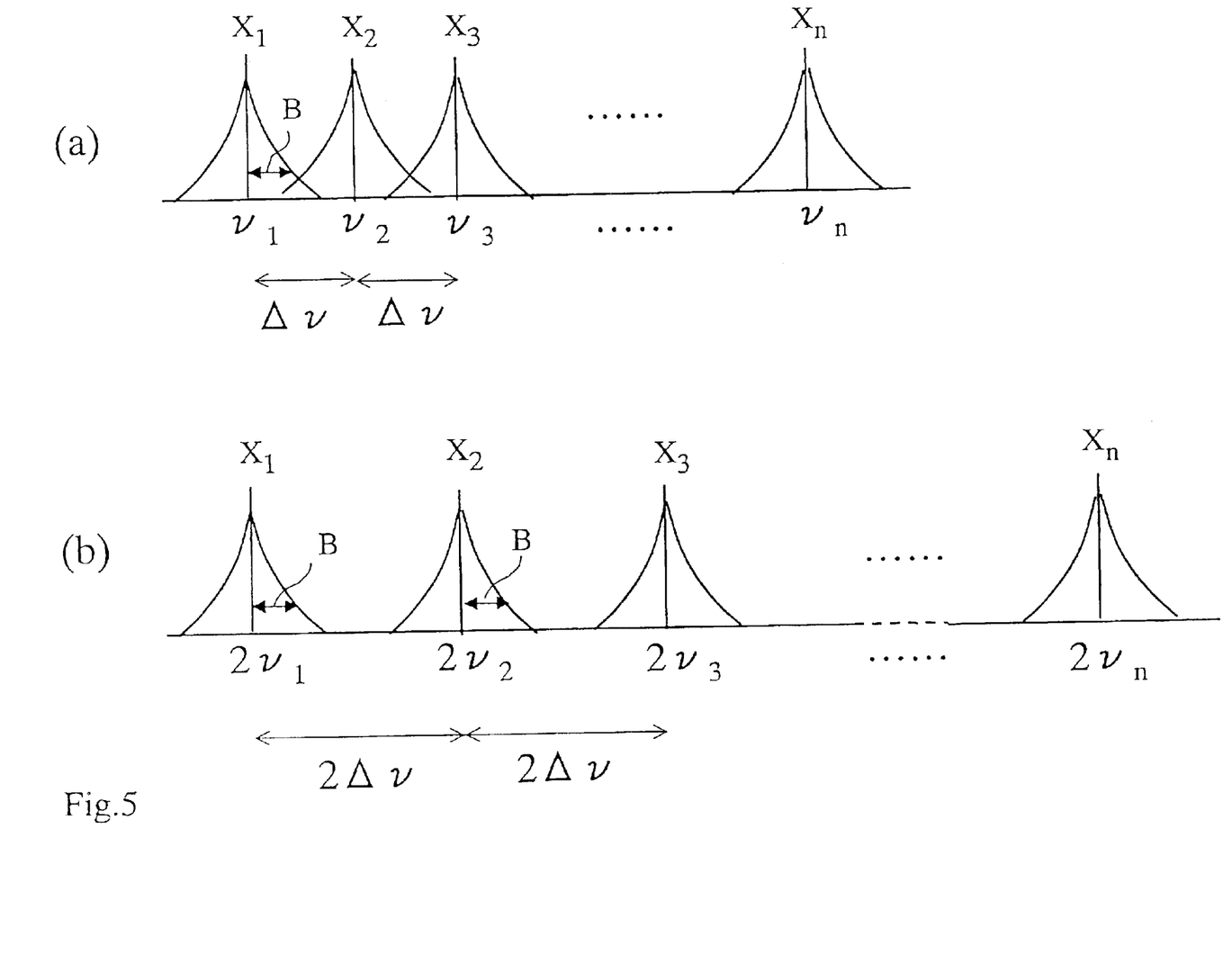
FIG. 5 shows frequency spectra of multiple modulated carriers (a) before and (b) after the frequency conversion.

The modulated carriers as shown in FIG. 5(a) are combined with a wavelength multiplexer 13 to the wavelength multiplexed light wave, and then coupled to an optical fiber and transmitted. The wavelength multiplexed light wave should be amplified with an erbium doped optical fiber amplifier (EDFA) 15 to compensate for the attenuation during transmission through fiber. In the present embodiment, after transmission for required distance, the light wave is amplified up to the power of about 100 mW using EDFA 16.

Then the wavelength multiplexed light wave is input to an SHG device 17-1. Since the SHG device 17-1 is kept phase matching only for very narrow bandwidth at the center wavelength of v1, only the light wave of the frequency of v1 is doubled to 2v1. The wavelength is converted to λ1/2= 775.06 nm. On the other hand, SHG device 17-1 is not matched to the phase of the frequency range of v2~vn. Therefore the waves in this frequency range are not frequency doubled.

The modulated carrier converted to frequency of 2v1 is separated from the non-converted wavelength multiplexed light wave with a wavelength demultiplexer 18-1. The separated modulated light signal is converted to electrical signal with a photo detector 19-1. Because the frequency spacing between 2v1 and v2 is 193350 GHz, which is very much wider than the original spacing of 50 GHz between v1 and v2, the required performance of the wavelength demultiplexer is very much relaxed and a demultiplexer having relatively small wavelength resolution can be used. In this embodiment, a multi-layered dielectric filter designed f.

the edge wavelength of around 1000 nm was used. As a photo detector 19-1, a high speed PIN photodiode of Si was used because the wavelength is converted to 780 nm range.

Next, the second carrier (frequency: v2) is converted in frequency with an SHG device 17-2, separated with a wavelength demultiplexer, 18-2, and converted to electrical signal with a photo detector 19-2. Also carriers of the frequency from v3 to vn−1 are converted in frequency with SHG devices 17-3~17-(n−1). Finally the carrier of the frequency of vn is input to an SHG device 17-n, and converted to the frequency of 2vn. Then the optical signal is converted to electrical signal with a photo detector 19-n. Although the last frequency of vn may be converted as it is, it is preferred to convert in frequency, because the use of the common Si photodiode as the photo detector 19-n has advantage for the system design.

Since the frequency spacing between the up-converted channel and the non-converted channel is v1, which is much larger than the frequency spacing Δv between the un-converted, fundamental channels, the above scheme is very effective in relaxing the required performance of the wavelength demultiplexer.

Figure 6:
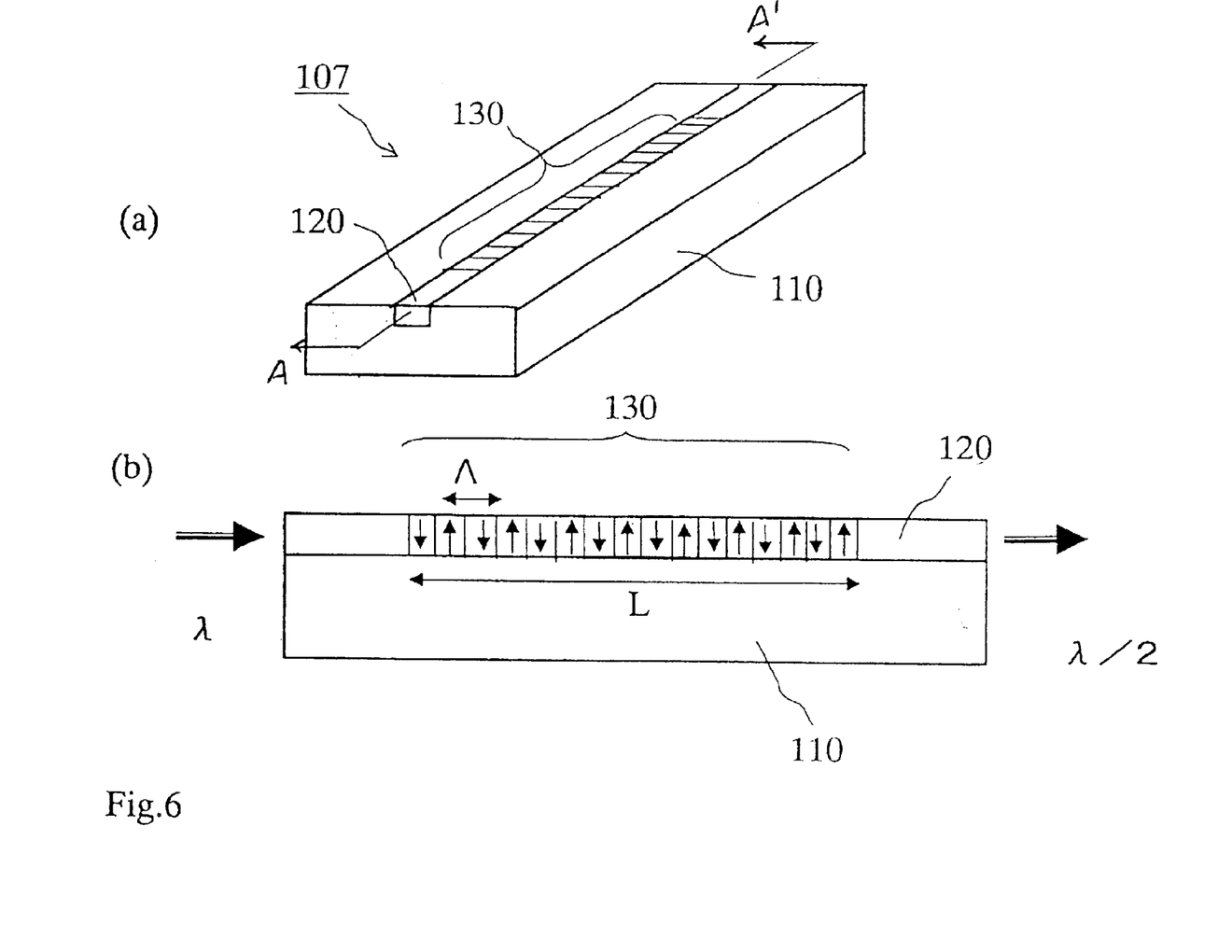
FIG. 6 shows (a) a perspective view of the QPM device and (b) its cross sectional view.

To build the above system of the present invention, the specific SHG devices are required which are respectively adjusted for phase matching to only one frequency of each carrier. A quasi-phase-matching (QPM) device was used as the SHG device in this embodiment. The QPM device has a periodically domain-inverted structure in LiNbO₃ optical wave guide. FIG. 6(a) shows a perspective view of the QPM device, and FIG. 6(b) shows cross section of the device along the line of A–A'.

In this QPM device 107, the optical wave guide 120 is formed on the surface of a single crystalline LiNbO3 substrate 110 by forming high refractive index stripe region using the ion exchange technique or the like. Along the propagation direction of the optical wave guide 120, the domain-inverted region 130 is formed, wherein the period is Λ, and length is L. In FIG. 6(b), arrows schematically show the direction of polarization in the domain-inverted region 130. The structure can be fabricated by applying electrical field to stripe electrodes having designed periodicity on the surface of the substrate.

In case of doubling the frequency v1, the period Λ1 of domain inversion is determined as follows. The phase-matching condition is shown by the following equation, $$2\beta_1(v) + K1 = \beta_1(2v),$$

where $\beta_1(v)$ and $\beta_1(2v)$ are the propagation constants of the wave guide for light frequencies of v1 and 2v1, respectively. And $K1 = 2\pi/\Lambda 1$. If the propagation constants are expressed by effective refractive indexes $N_1(v)$ and $N_1(2v)$, the above equation is rewritten as $$\Lambda 1 = (\lambda 1/2)/(N_1(2v) - N_1(v)).$$

Here λ1 is the wavelength corresponding to the frequency v1 (λ1=c/v1, where c is the velocity of light).

Also the period Λ2 for the adjacent channel of frequency v2 (wavelength λ2) is determined by the similar relation.

Here, the wavelength spacing between both channels is $\Delta\lambda$ $(=\lambda 2-\lambda 1)$, and the variation of effective refractive indices is $\Delta N_{12}(v)$, $\Delta N_{12}(2v)$. Then, $\Lambda 2$ is expressed as, $$\Lambda 2=((\lambda 1+\Delta\lambda)/2)/((N_1(2v)-N_1(v))+(\Delta N_{12}(2v)-\Delta N_{12}(v))).$$

Since the refractive index of $LiNbO_3$ has wavelength dispersion, the absolute values of refractive indices are different in between the wavelength bands of 1550 nm and 780 nm, and also the variations of refractive indices for wavelength are not equal. $\Delta\lambda$ (~0.4 nm) is negligibly smaller as compared with $\lambda 1$ (~1550 nm). However, $(\Delta N_{12}(2v)-\Delta N_{12}(v))$ is not negligible against $(N_1(2v)-N_1(v))$. Therefore $\Lambda 2$ cannot be regarded as the equal value to $\Lambda 1$ for even such a small change of wavelength $\Delta\lambda$. This means that the efficiency of second harmonic generation of the SHG device designed for the channel of frequency v1 is quite low for frequency v2. A width of wavelength at half maximum of SHG output depends on the length L of domain-inverted region. If the length L is approximately 5 cm, the width of wavelength is less than 0.2 nm. Thus the QPM device has enough performance to apply for the case of frequency spacing of 0.4 nm. If the QPM devices having the period of domain-inversion of $\Lambda 1, \Lambda 2, \ldots, \Lambda n$ for the frequencies of v1,v2, ..., vn can be prepared, the optical communication system as shown in FIG. 2 is possible to be constructed.

Figure 7:
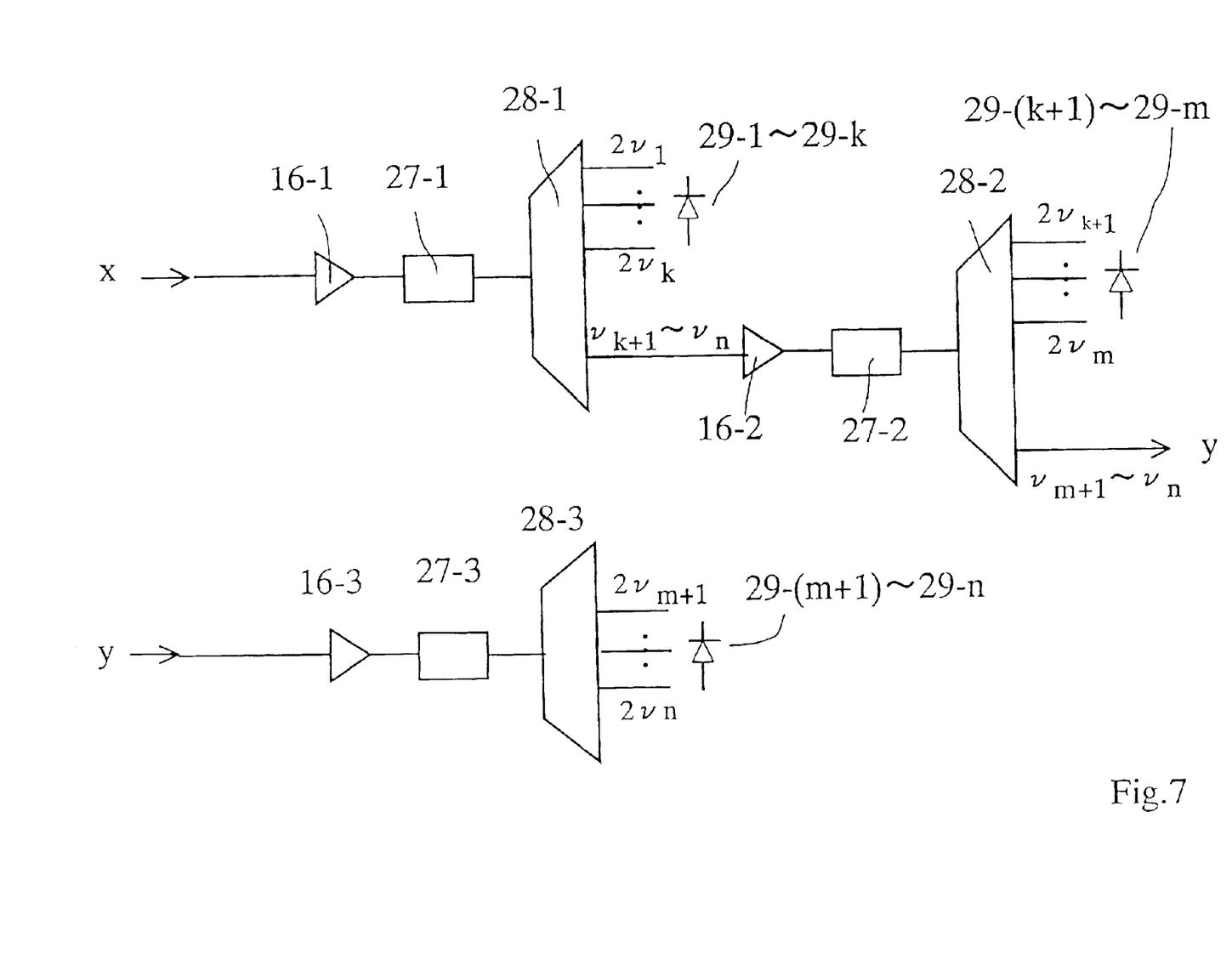
FIG. 7 shows a schematic diagram of the optical communication system of another preferred embodiment.

FIG. 7 shows another embodiment. The arrangement until coupling the wavelength multiplexed light wave to optical fiber 14 is neglected in FIG. 6, because this arrangement is the same as shown in FIG. 4. In the transmitted light signal, the carriers of the first frequency range of v1–vk are only doubled with an SHG device 27-1. The carriers in converted frequency range of 2v1–2vk are separated each other with a wavelength demultiplexer 28-1, and converted to electrical signals with photo detectors 29-1 to 29-k. The carriers in the frequency range of v(k+1)–vn are not converted in frequency with the SHG device 27-1. This means that the SHG device 27-1 is phase-matched in the frequency range of v1–vk.

Next, the carriers of the second frequency range of v(k+1)–vn are doubled with an SHG device 27-2. The carriers in converted frequency range of 2v(k+1)–2vm are separated each other with a wavelength demultiplexer 28-2, and converted to electrical signals with photo detectors 29-(k+1) to 29-m.

Finally, the carriers of the residual frequency range of v(m+1)–vn are doubled with an SHG device 27-3. The carriers in converted frequency range of 2v(m+1)–2vn are separated each other with a wavelength demultiplexer 28-3, and converted to electrical signals with photo detectors 29-(m+1) to 29-n.

Although above embodiment shows the case of 3 divided frequency range, the number of frequency range is not limited to 3, and it is possible to arrange the system with any number of frequency ranges. It is also possible to convert their frequencies in all frequency ranges with a plurality of carriers. In such case, since the frequency spacing between all the frequencies converted carriers each other are doubled as shown in FIG. 5(b), the cross talk between adjacent channels can be suppressed.

In above embodiment, $LiNbO_3$ QPM device is used as an SHG device applicable to 1550 nm wavelength band in optical communication. However, QPM devices using $LiTaO_3$ or KTP ($KTiOPO_4$) crystal or the like can be applied. Further, silica fibers, with periodically doped Germanium and Phosphorous long light propagation axis, can also generate the second harmonic wave in 1550 nm band. This type of SHG device is suitable to the optical fiber communication system. Not only QPM devices but also birefringent optical crystals like KTP or BBO ($\beta$-$BaBO_3$) can also generate the second harmonic wave. In this case, technique so-called angle phase matching or the like must be applied, wherein light incident direction must be selected at a specific angle for crystal axis.

As described above, the wavelength is converted from 1300 or 1550 nm bands to 650 or 780 nm bands by doubling the frequency of carrier usually used in optical communication. Therefore a GaAs based photodiode can also be applied. These Si or GaAs based photodiodes can be produced with lower cost compared with InP based photodiode used in conventional system. And the Si photodiode has an advantage that it is possible to integrate with Si—Ge based hetero-bipolar transistors or the other Si based electronic devices.

Further, the higher order (third order or more) harmonic wave can be used. Since the spacing between converted frequencies gets wider with increasing order of harmonic wave, the channel separation gets easier. In other words, the WDM channel density can be increased with less cross-talk penalty. However, the efficiency of harmonic wave generation is lower, higher the order of harmonics. Therefore larger amplification may be required to generate higher harmonics. We anticipate that with the advancement of nonlinear wave guide technologies, including photonic crystals, efficient harmonic generation with integrated chips will become feasible.

What is claimed is:

1. An optical communication system comprising:
a plurality of optical sources generating carriers having unique WDM wavelengths, the same number of optical modulators independently modulating the amplitudes of said carriers, a wavelength multiplexer multiplexing said modulated carriers to form a multiplexed wave, an optical fiber propagating said multiplexed wave, a wavelength demultiplexer separating said propagated wave to a plurality of modulated carriers with different wavelengths, and a plurality of optical detectors detecting said separated carriers and converting to electrical signals,
wherein an N-th order harmonic generator (N is an integer larger than 1) for multiplying frequencies of said carriers having unique WDM wavelengths is inserted at the front end of said demultiplexer at the receiving station.

2. An optical communication system according to claim 1, wherein said N-th order harmonic generator converts a single frequency in said propagated wave to N times, and leaves the rest of the frequencies unchanged.

3. An optical communication system according to claim 2, wherein said demultiplexer separates converted waves from the remaining unconverted frequencies.

4. An optical communication system according to claim 1, wherein said N-th order harmonic generator converts a partial range of frequency in said propagated wave to N times, and leaves the rest of the frequencies unchanged.

5. An optical communication system according to claim 4, wherein said demultiplexer separates converted waves from each other and from the remainder of said unique WDM frequencies.

6. An optical communication system according to claim 1, wherein said plurality of optical modulators are located between the optical sources and the wavelength multiplexer.

7. An optical communication system according to claim 1, wherein said N-th order harmonic generator is a quasi-phase matching (QPM) device.

8. An optical communication system according to claim 7, wherein said QPM device is a $LiNbO_3$ QPM device.

* * * * *